United States Patent [19]

Crabtree et al.

[11] Patent Number: 4,922,979

[45] Date of Patent: May 8, 1990

[54] LOG CORE STEADY REST

[75] Inventors: Wayne L. Crabtree, Eugene; Robert C. Young, Aumsville, both of Oreg.

[73] Assignee: Premier Gear & Machine Works, Portland, Oreg.

[21] Appl. No.: 360,853

[22] Filed: Jun. 2, 1989

[51] Int. Cl.$^5$ .......................... B27B 1/00; B27L 5/02
[52] U.S. Cl. ................................. 144/357; 144/213; 144/365
[58] Field of Search ................... 144/209 R, 211, 213, 144/213 A, 357, 356, 365

[56] References Cited

U.S. PATENT DOCUMENTS

| | | | |
|---|---|---|---|
| 2,884,966 | 5/1959 | Zilm | 144/209 |
| 3,040,791 | 6/1962 | Fauchon | 144/209 |
| 3,078,887 | 2/1963 | Heth . | |
| 3,421,560 | 1/1969 | Springate | 144/209 |
| 3,455,354 | 7/1969 | Calvert | 144/209 |
| 4,073,326 | 2/1978 | Pank et al. | 144/213 |
| 4,380,259 | 4/1983 | Brookhyser | 144/357 |
| 4,462,442 | 7/1984 | Pointere | 144/365 |
| 4,744,397 | 5/1988 | Lorenzo | 144/365 |
| 4,815,508 | 3/1989 | Carter | 144/365 |

FOREIGN PATENT DOCUMENTS

| | | |
|---|---|---|
| 1202548 | 4/1986 | Canada . |
| 197801 | 1/1978 | U.S.S.R. . |
| 821148 | 4/1981 | U.S.S.R. . |

Primary Examiner—W. Donald Bray
Attorney, Agent, or Firm—Robert L. Harrington

[57] ABSTRACT

A mechanism for adjusting the orientation of the arms that carry the backup rollers in a core steady rest. The rollers are rendered fixed relative to each other and relative to the arms. The arms are adjusted toward and away from the log as necessary to maintain equal contact of the two rollers on the log. The adjustment is preferably accomplished by mounting the arm ends opposite the rollers to an eccentric that pivots the arm ends in an arc toward the log.

6 Claims, 2 Drawing Sheets

LOG CORE STEADY REST

BACKGROUND OF THE INVENTION

1. Field of the Invention

The invention relates to the peeling of logs into veneer for plywood production and more particularly to the application of supporting rollers to counteract the forces imparted by the peeling blade on a log during the peeling process.

2. Background Information

A log is peeled in a lathe which chucks the log ends and turns the log while a blade the length of the log is advanced against the log, e.g. at a rate of one-tenth of an inch for each revolution of the log, thereby peeling off one-tenth inch thick veneer. A nose bar is pressed against the log immediately prior to the blade. This bar is beneficial in that it compresses the wood fibers and assists the peeling process. Considering the pressure of both the blade and nose bar, a very significant force is applied to the log. This force becomes a problem as the log is peeled down to a diameter where it will bend or bow between the chucked ends in a direction away from the forces applied by the blade and nose bar. Such bending or bowing will cause the peeled veneer sheeting to thin out across the center and render the veneer defective.

The answer to this problem is to apply a counter force in the form of backup rollers on the side of the log opposite the direction of the applied forces of the blade and nose bar. A single roller has been determined to be inadequate in providing this counter force. The blade and nose bar forces are not directed in precisely the same direction. They are not equal forces nor is there a consistent relationship between the forces. (The blade will encounter soft and hard spots, e.g. knots in the log and thus the cutting force of the blade increases and decreases relative to the force of the nose bar.) The vector of the two forces thus sweep back and forth over an angular range. Thus, it is preferable that at least a pair of backup rollers are applied to the side of the log spanning this angular range.

In providing the backup rollers, certain objectives need to be considered. It is necessary that the rollers apply very high forces in order to counterbalance the forces of the blade and nose bar. It is also necessary that the rollers maintain their respective positions straddling the zone of the sweeping vector force. Finally, it is necessary that the rollers apply similar counterbalancing forces.

Two other factors come into play. The logs are loaded into the chuck of the lathe from the side opposite the blade and nose bar. This is, of course, where the backup rollers are to be positioned. The rollers are thus mounted on pivotal support arms that will swing the rollers out of the way to permit loading of the logs into the lathe chucks. Also, as the log is peeled, e.g. from 24 inches in diameter to a core of 4 inches in diameter, the rollers have to shift around the log periphery in order to maintain the balance of contact as between the rollers. Simply pivoting the pivotal arms to move the rollers continuously toward the decreasing log diameter does not achieve the required shifting of the rollers around the log periphery. One roller or the other, sometimes in alternating sequence, will be moved into a more direct contact with the log, while the other is moved away from the log.

Several methods have been adopted to accommodate the required shifting of the backup rollers to maintain both in contact with the log In one method, the pair of rollers are mounted on brackets that are independently pivoted relative to the support arms. As the support arms are pivoted, the brackets are also pivoted as necessary to achieve the desired shifting of the rollers. In a second method (depicted in U.S. Pat. No. 4,380,259), one of the rollers is mounted directly on support arms and the second roller is mounted on secondary support arms which is adjusted independent of the first roller.

In either of the above methods, the solution to the problem of adjusting the outboard backup rollers has required a menagerie of pivot arms, brackets and motors to achieve the desired backup pressure and thereby avoid log core bending. Because the forces are extremely high, the punishment placed on the mechanical moving parts is severe. A log will be peeled every few seconds and, thus, the many moving parts are in perpetual motion. The initial expense of this mechanism is very high and the repair costs are comparably high.

BRIEF DESCRIPTION OF THE PRESENT INVENTION

The present invention has as a basic objective to simplify the apparatus for controlling the positions of the rollers while maintaining the ability to finely adjust the positions of the rollers as the log is peeled. In brief, the rollers are mounted on the outboard end of pivotal support arms. The rollers are fixed on the arms but the arms are adjustable. The principal adjustment feature accomplishes extension or withdrawal of the arms relative to the log. Thus, as one roller starts to ride up on the log to cause disengagement of the other roller, the arms are either extended or withdrawn to center the rollers on the log and thus equalize the pressure applied as between the rollers.

In a preferred embodiment, the pivotally attached ends of the arms are mounted on an eccentric and turning of the eccentric extends or withdraws the arms but in an arc that also slightly adjusts the angular relationship of the rollers. This angular adjustment is considered an added benefit that will become more evident upon reference to the following detailed description and drawings.

Figure 1:
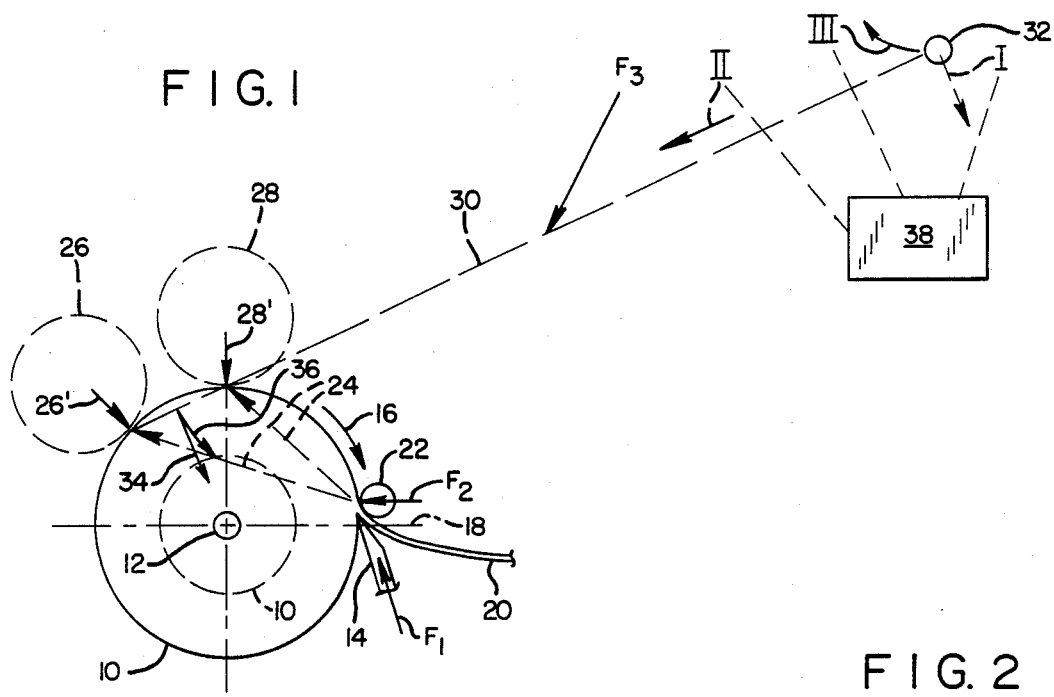
FIG. 1 is a schematic illustration of the function performed by the backup rollers and is an aid to an explanation of how the invention accomplishes that function.

Reference is made to FIG. 1 for an explanation of the problem and the concept of the invention as applied in solving the problem.

FIG. 1 is a schematic illustration of a log 10 mounted for rotation (arrow 16) in a lathe (spindle 12). A blade 14 is advanced toward the center of the rotating log toward spindle 12, along the horizontal line 18, and functions to peel off a continuous strip of veneer 20. A nose bar 22 precedes the blade 14 and presses against the log 10 to compress the fibers of the log which prepares the wood for peeling.

The blade 14 pressing against the rotating log generates a directional force $F_1$ that is coupled with the directional force $F_2$ of the nose bar 22 to create a force vector that urges a bending of the log directed in a range represented by arrows 24. To counter the force vector of forces $F_1$ and $F_2$, a pair of backup rollers 26, 28 are pressed against the back and top of the log at the points of contact indicated by arrows 26', 28', i.e. essentially straddling the angular range of arrows 24.

The rollers are mounted on an arms 30 (shown as dash lines only in FIG. 1) that are pivoted at a pivot point 32. A force $F_3$ is applied to the arms 30 to create the counterbalancing force for the backup rollers.

The pressure at contact points 26', 28' applied by rollers 26, 28 must be balanced. This can be achieved by moving the rollers 26, 28 together in a straight line parallel to the directional arrow 34. However, arms 30 if fixedly pivoted at point 32, produce a movement of rollers 26, 28 that follows a curved path represented in FIG. 1 by arrow 36. Even a slight variation from path 34 dramatically changes the pressure balance as between contact point 26' and 28' and cannot be tolerated. For example, contact point 26' starts to ride up the curved periphery of log 10 and roller 28 represented by contact point 28' is lifted free.

Because of the necessity of maintaining balance between the contact points 26', 28', the prior solutions have provided independent control over the two rollers. The complexity involved in achieving that control can be seen from U.S. Pat. No. 4,380,259.

The solution of the present invention is to provide control over the positioning of arms 30. At least three variations of controlled movement of arms 30 are contemplated. (First) If pivot 32 is moved parallel to arrow 34 at a rate of movement corresponding to the reduction in diameter of log 10, the rollers 26, 28 will also move parallel to arrow 34 and remain in balanced contact with the log. This variation is represented by arrow I. (Second) If arms 30 are lengthened (or if pivot 32 is shifted along the axis of the arm achieving the same result) by the difference between arrows 34 and 36, plus or minus the additional distance to accommodate the slight angular shifting between rollers 26, 28, the balance between 26' and 28' will also be maintained. Arrow II represents this second variation.

The third variation is considered the preferred embodiment and will be explained in more detail hereafter with reference to FIGS. 2 through 4. In essence, pivot 32 is mounted on an eccentric that is rotated about a fixed pivot. Forced rotation of the eccentric moves the pivot 32 in a curved path that both extends the arms 30 and changes the angular orientation. (See arrow III) The angular shifting (the pivot 32 being raised) positions the roller 26 further around to the backside of the log 10 as log 10 decreases in diameter. Roller 28 remains essentially at the top of the log. This relationship as the log 10 approaches its minimum diameter is preferred.

Further, the utilization of an eccentric for shifting the pivot 32 is considered a mechanically simple, sound and reliable way to achieve the desired position adjustment of the arms. Few moving parts are involved and control of the eccentric movement is readily available through a hydraulic motor.

In any event, all of the arm movements I, II or III are intended to be controlled by a computer. The motor means for all of the versions is activated by a computer (represented in FIG. 1 by box 38) and the computer is programmed to incrementally achieve the required arm movements as the diameter of log 10 is reduced. For example, the positions at spindle 12 and blade 14 will be known to the computer 38 which directly corresponds to the log diameter. The desired position of arms 30 or pivot 32 can be calibrated, e.g. by applying pressure gauges to rollers 26, 28 and shifting the arms or pivot of the arms as required at the different log sizes. The desired positions of the arms or pivot is recorded or programmed into the computer. Thus, the computer simply controls the movement of the arms, in accordance with its reading of the diameter of the log. A more detailed description of the preferred embodiment III follows.

Figure 2:
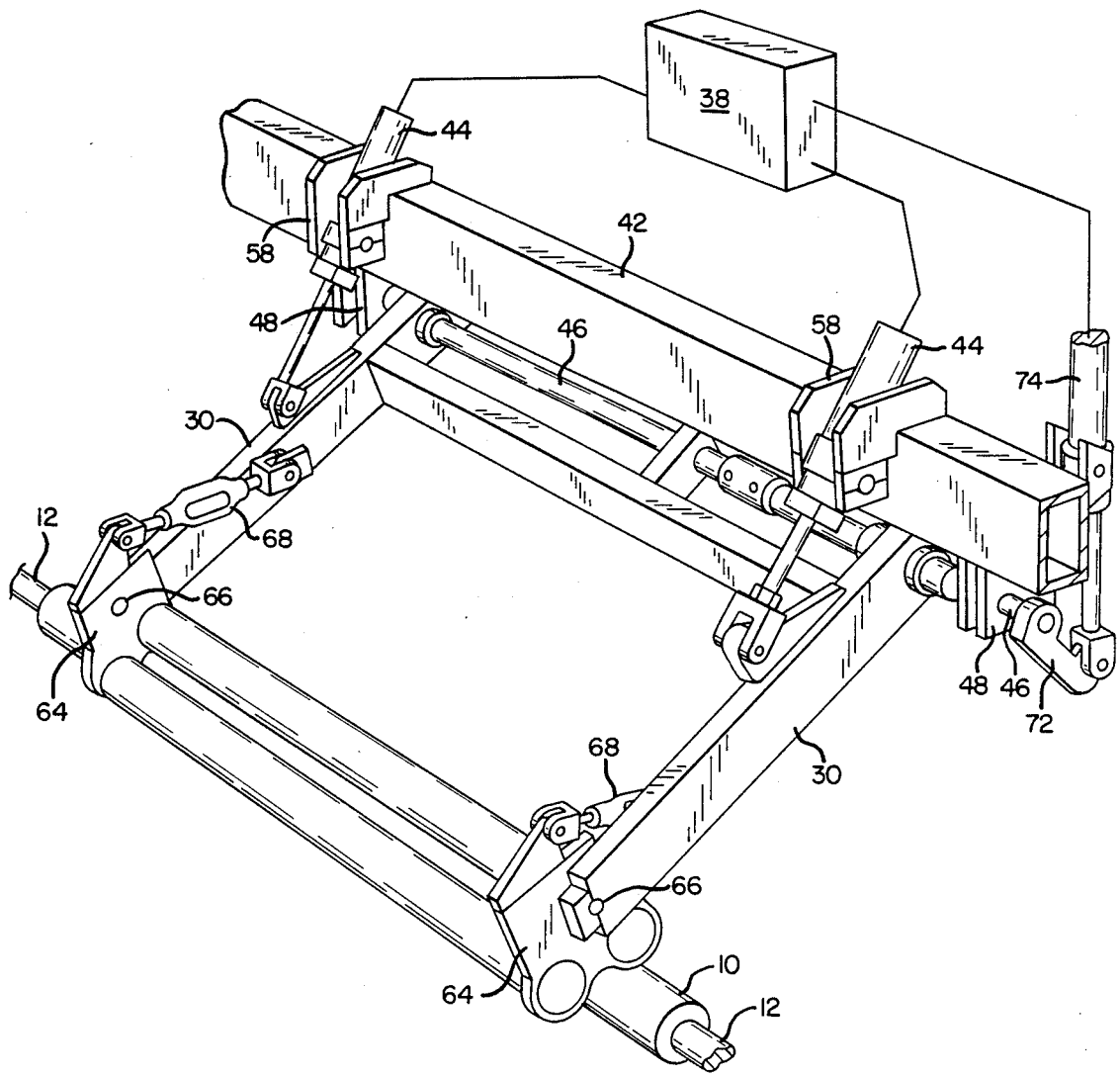
FIG. 2 is a perspective view of the apparatus of the preferred embodiment of the invention.
Figure 3:
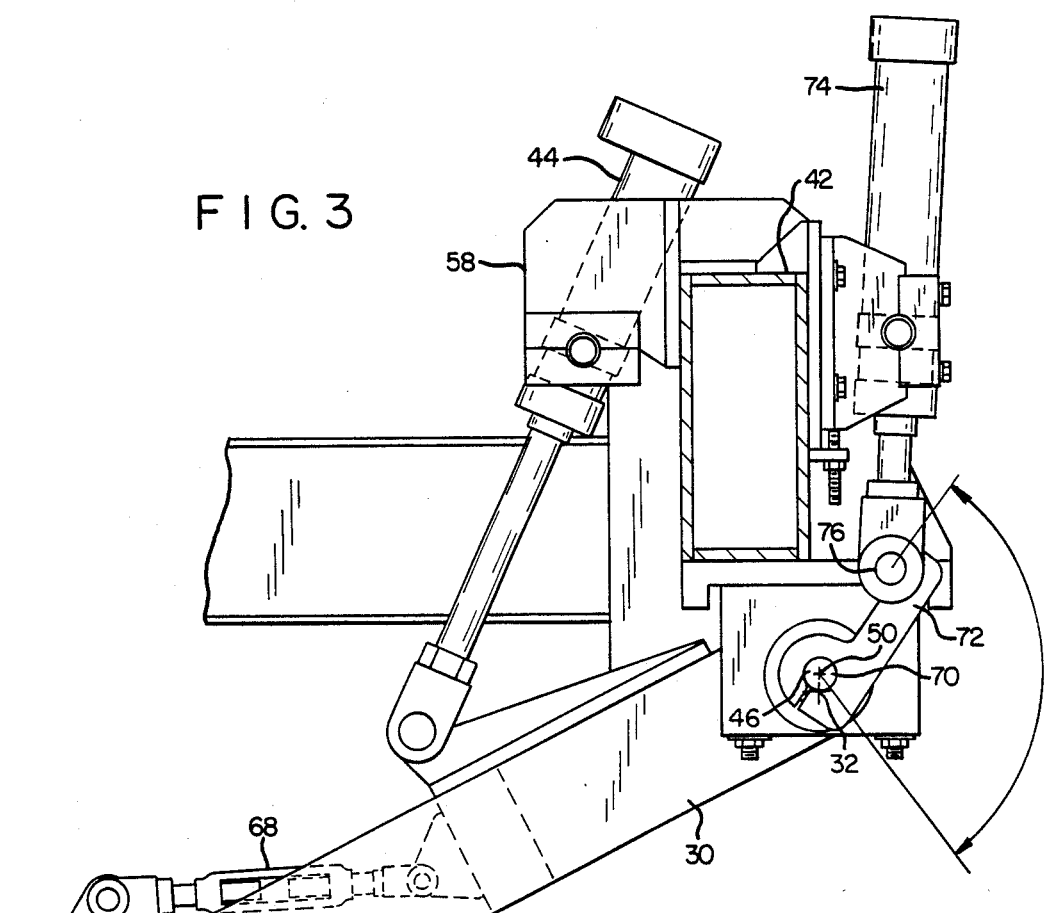
FIG. 3 is an enlarged side view of the apparatus of FIG. 2.

As illustrated in FIGS. 2 and 3, a conventional veneer lathe having opposed spindles 12 that are rotatably driven, supports and rotates a log 10. As the log 10 is rotated, a veneer blade 14 (FIG. 3) is fed toward the log's axis of rotation 40 (spindle 12) and upon contact with the log's periphery, peels a veneer strip off of the log. Further description of the veneer lathe is not provided since it is well known to the industry. The description is hereafter directed to the core steady rest assembly which is the subject of the present invention.

Arms 30 which carry backup rollers 26, 28 at their outboard ends are pivotally mounted at their opposite ends. The arms 30 are raised and lowered by hydraulic motors 44, which applies the pressure to rollers 26, 28. Arms 30 are pivotally mounted to a shaft 46 which in turn is mounted to a cross beam 42.

The cross beam 42 rotatably supports the shaft 46 through brackets 48 positioned to the underside of beam 42. Brackets 48 are positioned on beam 42 to place the center line (axis) 50 of the shaft 46 parallel to the axis of rotation of spindles 12. The brackets 48 are located near each end of said shaft as illustrated in FIG. 4. The shaft 46 has offset segments 52 inward from brackets 48 at each end that establish a center line that is offset from center line 50 by the distance 56. The offset segments 52 include the bearing supports 54 for arms 30 and the center of the offset establishes the pivotal axis 32 for arms 30 as previously discussed with reference to FIG. 1. Arms 30 are pivoted about their pivot axis 32 by hydraulic motors 44 that extend between the arms and brackets 58 carried by the cross beam 42.

Brackets 64 are pivotally mounted (pivot 66) at the outboard end of arms 30. The backup rollers 26, 28 are rotatably mounted to brackets 64 below the pivot 66. The axis through each roller 26, 28 is an equal distance from the pivot 66. The brackets 64 are pivoted about axis 66 by turn buckles 68. The turn buckles 68 are used to initially set the angular orientation of rollers 26, 28 relative to arms 30. Once this desired angular orientation is established (with the two rollers equally contacting the log along their lengths at the initial point of contact), the turn buckles are rendered dormant and may be fixed as by welding to insure against inadvertent mis-adjustment.

Figure 4:
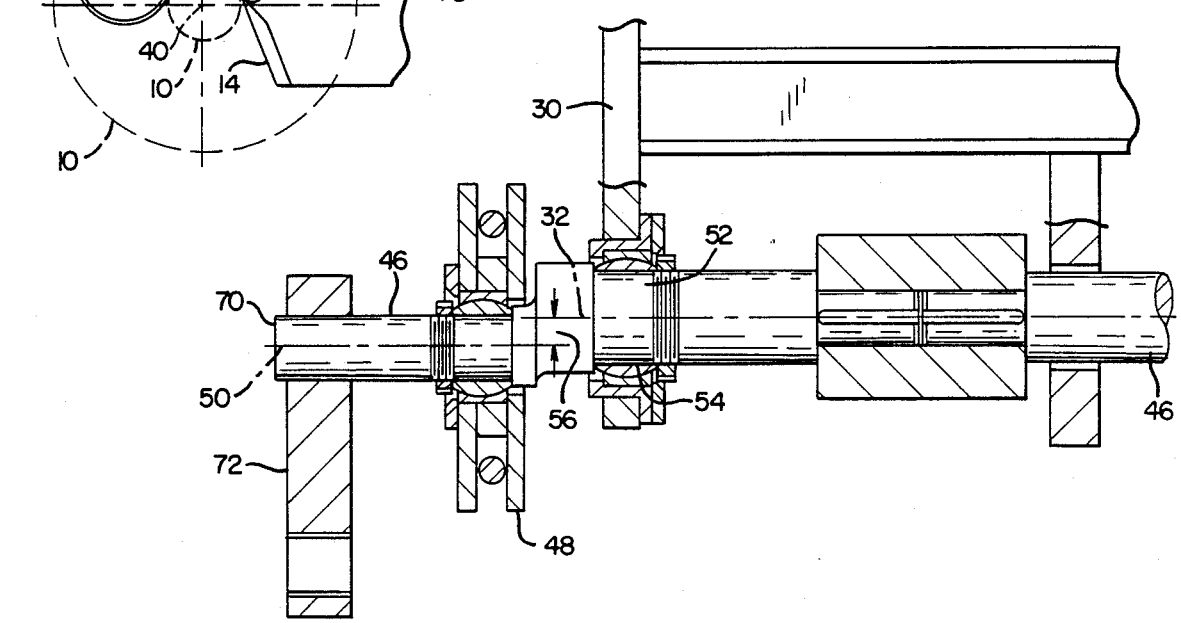
FIG. 4 is a partial view of the eccentrics taken on view lines 4-4 of FIG. 3.

With reference to FIG. 4, shaft 46 has a shaft end 70 that is configured for attaching actuating arm 72, the actuating arm being fixedly attached to shaft end 70 at a selected reference position relative to offset segment 52. This relative position is changeable by removing actuating arm 72 from shaft end 70 and re-attaching the arm in a position where offset 52 is rotated to a different position. The actuating arm 72 extends outwardly from shaft end 70 normal to axis 50 of shaft 46, the outward end of arm 72 connected to a hydraulic motor 74 by pin 76. The hydraulic motor 74 is mounted to the cross beam 42.

The hydraulic motor 74 moves actuating arm 72 causing rotative motion to shaft 46. Rotation of shaft 46 any part of a revolution changes the position of the pivot axis 32 of the arms 30 relative to the log. This change is along a path that is a segment of a circle having a radius 56, the distance between the arm pivot 32 and the axis of rotation 50 of shaft 46. The segment of the circle through which pivot 32 is moved will cover an angular range of about 45 degrees but not more than 90 degrees. The start up and finish point will vary depending on the configuration of arc 36 as compared to directional arrow 34, and further depending on radius 56. This varying pattern of movement is accordingly determined by the relationship of the lathe components and is referred to as the lathe configuration. It is believed that the start up position is preferably at the bottom of the circle and extends outward and upward as the log diameter is reduced as indicated by arrow III in FIG. 1.

In any event, during the peeling operation of a log on a veneer lathe, the computer 38 controls the motion of the arms 30 through control of motors 44 and 74. Feedback information from the feed mechanism 78 (which feeds blade 14 into the log 10) provides the computer 38 with continuous data as to the log diameter. When the log has decreased to a diameter that requires backup force, the computer in response to the feedback data and the prior calibrations, actuates motors 44 and 74 to place the rollers 26, 28 against the log, applying the desired resistance $F_3$ to the log for counterbalancing forces $F_1$ and $F_2$.'

As previously discussed, the basic concept of the invention is the provision of control over rollers 26, 28 by maneuvering the orientation of arms 30. Two variations (I and II) of the invention have been suggested. Others will become apparent to those skilled in the art upon acquiring an understanding of the invention as related above. Such variations are intended to be encompassed in accordance with the definition of the following claims.

We claim:

1. A veneer peeling lathe having spindles for pinning a log at its end, drive means for rotatably driving the spindles and a log pinned by the spindles, a veneer peeling blade that is controllably fed into the log i a direction toward the axis of rotation and a nose bar that presses into the log preceding the peeling blade, said blade and nose bar creating a force urging bending of the log between the spindles, a core steady rest including a pair of arms each having an attached end and a pivotal end, a pair of rollers mounted on and spanning the distance between the pivoted ends of the arms, a fixed support beam, mounting means for mounting the attached ends of the arms to the beam and establishing thereby a determined distance between the fixed support beam and the rollers, said mounting means including pivotal mounting means and motor means for pivoting the pivoted ends of the arms and the rollers carried thereby against the log in the spindles at a side of the log to counter the bending force of the blade and nose bar and to continue pivoting movement of the arms and rollers to maintain supporting contact of the rollers against the log as the log diameter is decreased due to veneer peeling, and the improvement that comprises;

means for fixing the relative positions of the pair of rollers and arms and including arm adjustment means for adjusting the distance between the fixed support beam and the rollers as necessary to maintain a balance of pressure exerted against the log by the pair of rollers, and computer means controlling the arm adjustment means, said computer means programmed with adjustment calibrations matched to the lathe configuration and responsive to the changing diameter of the log to adjust the arms in accordance with the calibrations and thereby achieve said balance of pressure.

2. A veneer peeling lathe as defined in claim 1 wherein the pair of rollers are mounted on brackets that are pivotally mounted to the arms, roller adjustment means for pivoting the brackets and thereby adjusting the rollers for balancing the application of contact by the rollers on the log at the start up position, and lock means for locking the roller adjustment means to the desired position and for maintaining the locked condition throughout the peeling process.

3. A veneer peeling lathe as defined in claim 1 wherein the mounting means for the arms comprises an eccentric that is pivotally attached to the support beam at a first axis and pivotally attached to the arm ends at a second axis spaced from the first axis, and said arm adjustment means comprises a motor means connected between the support beam and eccentric to rotate the eccentric about its first axis and thereby generate pivoted movement of the second axis for adjusting the distance between the fixed support beam and the rollers.

4. A veneer peeling lathe as defined in claim 1 wherein the mounting means for the arms comprises a moving pivot, and wherein the center point between the axes of the rollers and the axis of rotation of the log define a direction, said moving pivot being controllably movable in a direction parallel to said defined direction.

5. A veneer peeling lathe as defined in claim 1 wherein said extendable and retractable means for extending and retracting the arms, said extendable and retractable means under control of the computer means.

6. A method of supporting a log being peeled which comprises;

providing a pair of rollers extending between one and each of parallel directed arms that are pivoted at their opposite ends at a position spaced above and laterally from the log on the same side to which the peeling is taking place, and providing lateral adjustment of the arms for projecting the rollers so that one roller engages the top of the log and the second roller engages with equal pressure the side of the log opposite the side to which the peeling is taking place, calibrating the positions of adjustment of the arms to accommodate the declining size of a log diameter and the lathe configuration, controlling the lateral adjustment of the arms with a computer means and programming the computer means with the calibrations and the varying log size whereby adjustments are made to the arms by the computer means as dictated by the calibrations.

* * * * *